United States Patent [19]

Asai

[11] Patent Number: 5,044,760
[45] Date of Patent: Sep. 3, 1991

[54] CLOSED TYPE KNEADER

[75] Inventor: Toshihiro Asai, Kobe, Japan

[73] Assignee: Kabushiki Kaisha Kobe Seiko Sho, Kobe, Japan

[21] Appl. No.: 404,752

[22] Filed: Sep. 8, 1989

[51] Int. Cl.$^5$ .............................. B01F 7/04; B29B 7/20
[52] U.S. Cl. .......................................... 366/97; 366/76
[58] Field of Search .................. 366/76, 77, 75, 97, 366/69, 194, 196, 189, 297, 300, 301, 325, 327, 329, 91, 84, 85; 425/204, 209

[56] References Cited

U.S. PATENT DOCUMENTS

| | | | |
|---|---|---|---|
| 1,563,524 | 12/1925 | Prescott | 366/300 X |
| 2,015,618 | 9/1935 | Cooke | 366/301 X |
| 2,559,418 | 7/1951 | Ford | 366/301 X |
| 2,736,754 | 2/1956 | Webb | 366/77 X |
| 3,230,581 | 1/1966 | Tyson et al. | 366/97 |
| 3,490,750 | 1/1970 | Brennan, Jr. | 366/85 |
| 3,734,468 | 5/1973 | Cheng et al. | 366/300 |
| 4,184,773 | 1/1980 | Ellwood | 366/300 X |
| 4,234,259 | 11/1980 | Wiedmann et al. | 366/300 X |
| 4,300,838 | 11/1981 | Sato et al. | 366/97 X |
| 4,718,771 | 1/1988 | Asai et al. | 366/97 |
| 4,859,074 | 8/1989 | Asai et al. | 366/97 |

Primary Examiner—Harvey C. Hornsby
Assistant Examiner—Scott J. Haugland
Attorney, Agent, or Firm—Oblon, Spivak, McClelland, Maier & Neustadt

[57] ABSTRACT

A closed type kneader has two rotors rotatably mounted in a casing for rotation about parallel axes. Two blades extend from each of the rotors such that the blades of the rotors intermesh. Each rotor has both a main blade and an auxiliary blade. The auxiliary blade has a length not less than one-half of the length of the rotor and an angle of torsion not smaller than 0° in the same direction as the angle of torsion of the main blade. The rotors are rotated in synchronism with one another so that the main blade tip of each rotor may be in phase with the auxiliary blade tip of the other rotor at the axial centers of the rotors.

4 Claims, 6 Drawing Sheets

CLOSED TYPE KNEADER

BACKGROUND OF THE INVENTION

1. Field of the Invention

The present invention relates to an improvement of kneading rotors, particularly intermeshing type rotors, in a closed type kneader used for kneading mainly rubber and plastic materials.

2. Description of Related Art

As known, a closed type kneader such as a batch type kneader suitable for kneading such high polymers as rubbers and plastics, is an indispensable mechanical equipment in the rubber industry, such as in the production of tires. Requirements for this type of kneader involve high dispersion of additives into a main material and a highly homogeneous kneading, capability of a large volume introduction per batch, high productivity based on a short mixing time, and stable operation for each batch. According to a general structure of a closed type kneader, as will be described later, a pair of kneading rotors are disposed rotatably in opposed parallel relation to each other within a kneading chamber of a cylinder provided with heating or cooling means, and a material feed hopper having a forcing ram is provided at the top of the kneading chamber. One batch of material to be kneaded is introduced at a time from the hopper. The material is introduced into the kneading chamber by pull-in force (bite-in ability) induced by the rotors and the pressure of the forcing ram. When the entire material is completely forced into the kneading chamber by the ram there is started homogeneous kneading of the entire material due to rotation of the rotors. Therefore, it can be said that in such a kneader, completing the introduction of the material to be kneaded into the kneading chamber quickly and stably lead to shortening of the kneading time, improvement of the mixing performance and stable operation. On the other hand, as already known, closed type kneaders are broadly classified into non-intermeshing type (tangential type) kneaders wherein a pair of kneading rotors are not in mesh with each other, and intermeshing type kneaders wherein a pair of kneading rotors are in mesh with each other. Of the two types, the non-intermeshing type kneaders are generally known for permitting the introduction of a large volume of material and being superior in bite-in ability and high in their operability and stability. On the other hand, the intermeshing type kneaders are generally evaluated as being high in the additive dispersing ability and homogenizing ability. These are also already known. Needless to say, moreover, it is well known that various versions of each type of kneader are existent. For example, as to non-intermeshing type kneaders, the applicant in the present case has already filed Japanese Patent Application Nos. 927/84 and 184506/85, and as to intermeshing type kneaders, filed Japanese Utility Model Application No. 28833/71 and Patent Application Nos. 42083/74, 82005/78 and 106725/79.

Of the two types mentioned above, for intermeshing type kneaders, though their uniform additive dispersing ability and homogeneous kneading ability are high, it is generally difficult to introduce a large amount of material into the kneaders, and the bite-in ability is poor, so the operability and productivity are low; besides, unstable bite-in performance leads to an increase in the scatter of quality between batches, thus making production control difficult. The existence of such drawbacks common to intermeshing type kneaders is also a known fact. In this connection, the bite-in performance of an intermeshing type kneader and that of a non-intermeshing type kneader were compared using two laboratory apparatus. It turned out that the intermeshing type kneader exhibited a problem in its bite-in performance for the reason set forth below. One laboratory apparatus is a model kneader having an inside diameter of a kneading chamber of about 200 mm and an axial length shortened to $\frac{1}{3}$ of the corresponding mixer (kneader), in which the material motion in the sectional direction of rotors can be observed through a glass window provided in a side face of the kneading chamber. The other laboratory apparatus is a model kneader having an inside diameter of a kneading chamber of 100 mm and an axial length same as that of the corresponding mixer (kneader), in which there are used rotors each constituted by a laminate of thin iron sheets. It is possible to set various blade arrangements and the kneading chamber is formed of a transparent resin to permit observation of the material motion in the interior.

In the non-intermeshing type, as shown in FIGS. 12, 14, 15 and 16, a pair of kneading rotors 10, 10 are rotatably disposed in parallel in non-intermeshing positions within a kneading chamber 6 formed in a cylinder 5, a hopper 7 provided with a forcing ram 8 is opened in the upper portion of the kneading chamber 6, and a door portion 9 is formed centrally of the bottom of the kneading chamber 6. As shown in FIG. 12, since the space of a communicating portion 11 at the center of the kneading chamber 6 is wide, the material fed from the hopper 7 and introduced under pressure by the forcing ram 8 is extremely easily introduced into the kneading chamber. Further, since there is a speed ratio (1.1~1.2) between the right and left rotors 10, 10, the action of pulling in a material 12 from the hopper 7 by both rotors 10, 10 is extremely strong, as shown in FIG. 14, at the time of a periodic synchronism (phase 0°) of the tips of blades 10a, 10a which are formed axially twistedly on the peripheral surfaces of the right and left rotors 10, 10. This is also true when both rotors 10, 10 are 90° out of phase with each other as shown in FIG. 15. Further, the flow of the material 12 from the rotor front to the back surfaces in the kneading chamber 6 and that from the rotor back to the front surfaces are effected smoothly and in an extremely well-balanced state. In the drawings, arrow P indicates a rotating direction of each of the right and left rotors; arrow P₁ is an indicates the flow of the material 12; and 10a, 10b represent long and short blades formed on the peripheral surface of each rotor.

On the other hand, in the intermeshing type, as shown in FIGS. 13, 17 and 18, right and left rotors 10, 10 rotatably disposed in parallel and opposedly to each other within a kneading chamber 6 are in an intermeshing positional relation, so the inter-shaft distance of both rotors 10, 10 is relatively short as compared with that in the non-intermeshing type. Consequently, the space of a communicating portion 11 formed at the center of the kneading chamber is narrow, thus making it difficult for the material fed to enter the chamber, as is apparent from FIG. 13. In the intermeshing type, moreover, the right and left rotors 10, 10 are rotated at the same speed and their blades 10a, 10a are always 90° out of phase with each other as shown in FIG. 13, for preventing contact between the two. Moreover, each blade 10a is axially twisted as shown in FIG. 17, so the space from the hopper 7 to the door portion 9 is not fully opened at any time no matter in what state of phase both rotors 10, 10 are during their rotation, so that it becomes more difficult for the material to enter the kneading chamber.

Further, since the blades 10a, 10a of the right and left rotors 10, 10 are 90° out of phase with each other and both rotors 10 rotate in directions opposite to each other as indicated by arrow P, the material 12 which has been forced in from the hopper 7 through the forcing ram 8 is reciprocated from one rotor to the other rotor with a bouncing motion, as indicated by arrow $P_3$. Thus, there was confirmed the problem that the material 12 merely reciprocated between the right and left rotors just under the hopper without creation of a strong material pulling-in action based on synchronism of both rotors 10, 10 as in the non-intermeshing type.

SUMMARY OF THE INVENTIONS

According to an object of the present invention, the bite-in ability of the intermeshing type closed kneader described above is improved to complete the introduction of the material to be kneaded in a short time, thereby improving the productivity and operability of the kneader and making it possible to effect stable kneading and production.

For this purpose, in a closed type kneader having a casing an a pair of intermeshing type rotors, each rotor rotatable in the casing about parallel axis is a two-blade type rotor comprising a main blade and an auxiliary blade having an angle of torsion not smaller than 0° in the same direction relative to the main, blade, the auxiliary blade having a tip radius less than that of the main blade, and a length not smaller than ½ of the rotor axial length, and means for driving the rotors in synchronization with one another such that the main blade tip of one rotor is in phase with the auxiliary blade tip the other rotor at the rotor axial central part.

DETAILED DESCRIPTION OF THE PREFERRED EMBODIMENTS

Figure 1:
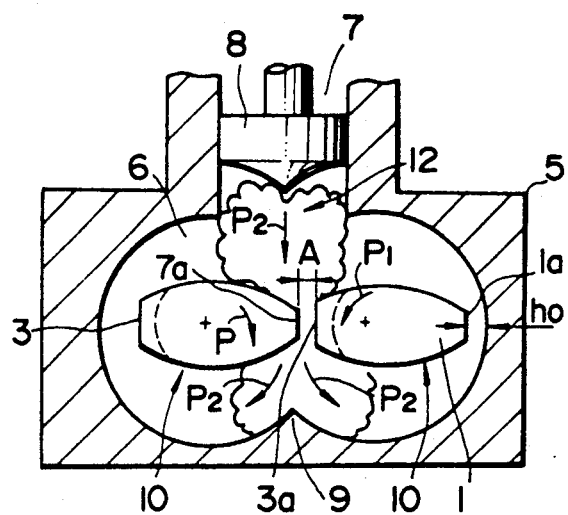
FIG. 1 is a front view in longitudinal section showing a synchronized state of both rotors in a kneader according to an embodiment of the present invention.
Figure 2:
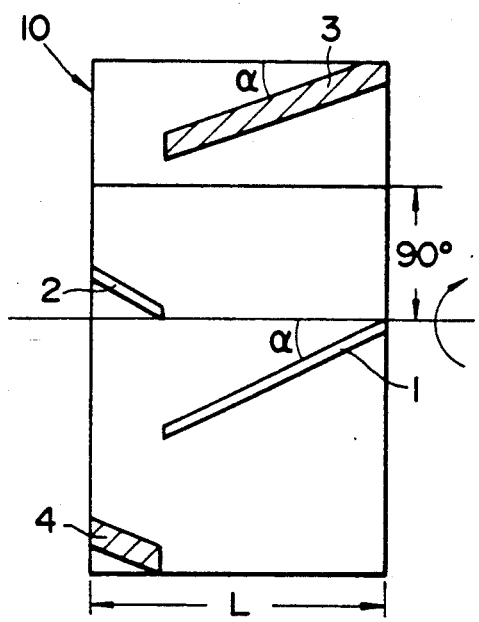
FIG. 2 is a developed plan view showing an example of a blade structure of a rotor therein.
Figure 3:
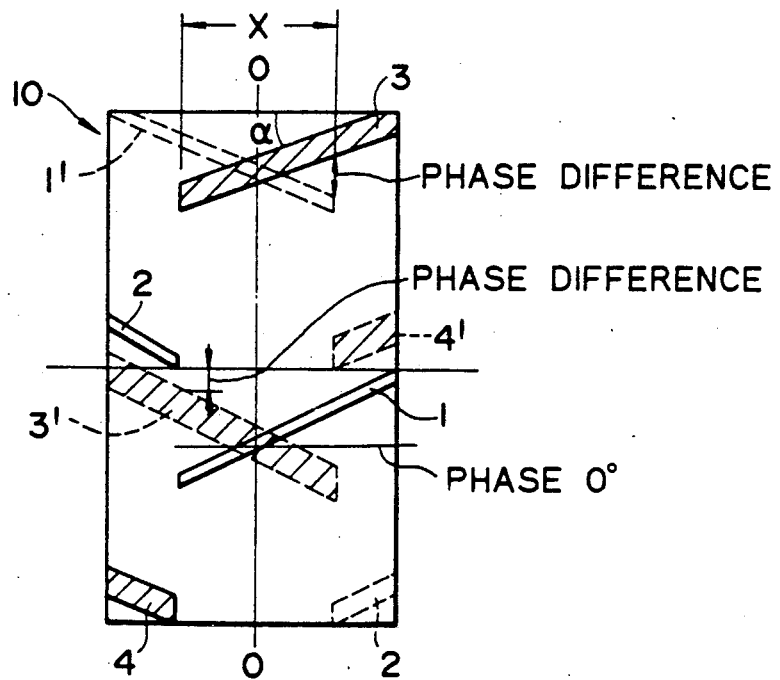
FIG. 3 is also a developed plan view showing a blade arrangement relation in right and left rotors.

According to the present invention, as in FIG. 1 showing right and left rotors meshing with each other at the respective axial central portions, also as in a development view of one rotor of FIG. 2 and further as in a development view of a relative positional relation of right and left rotor blades of FIG. 3, a pair of intermeshing type rotors 10, 10 are disposed side by side within a kneading chamber 6 so that the rotors can rotate at the same speed and their axes are parallel with each other. In this case, as shown in FIG. 2, the rotors 10, 10 are each a two-blade type comprising a main blade 1 extending axially at an angle of torsion $\alpha$ and an auxiliary blade 3 extending in the same direction at an angle of torsion $\alpha$ not smaller than 0° relative to the main blade 1. The auxiliary blade 3 has a length not smaller than ½ of a rotor axial length I, and, as shown in FIG. 1, a tip radius less than that of the main blade. Further, as shown in FIGS. 1 and 3, the right and left rotors 10, 10 are synchronously driven so that the auxiliary blade 3 of each rotor is in phase with the tip of the main blade 1 of the other rotor 10 at the rotor axial central part, whereby the following action is created.

Figure 4:
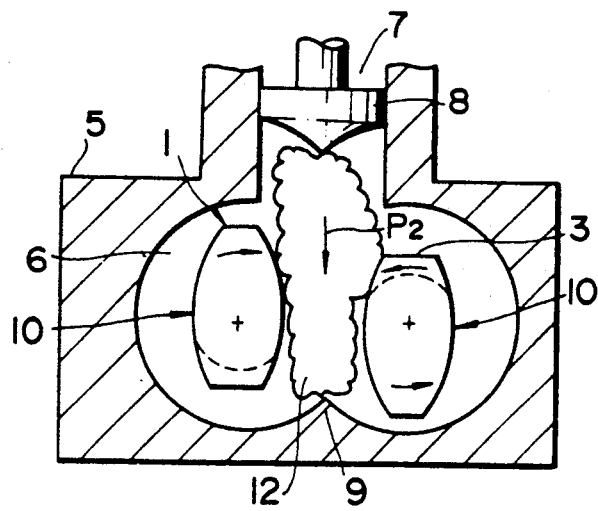
FIGS. 4 to 7 are explanatory views showing in what state material is pulled in and kneaded by the rotors.
Figure 5:
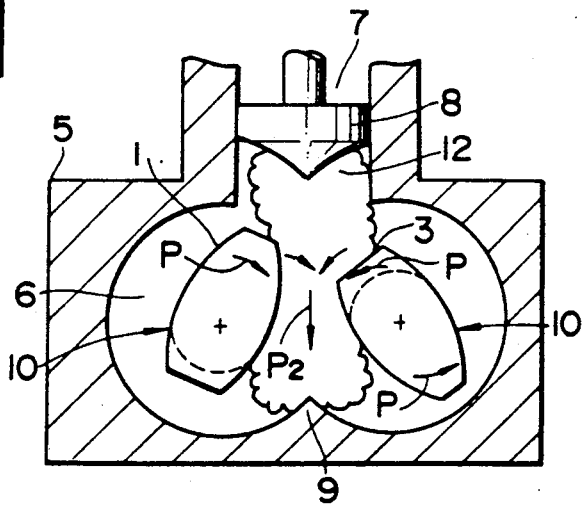
Figure 6:
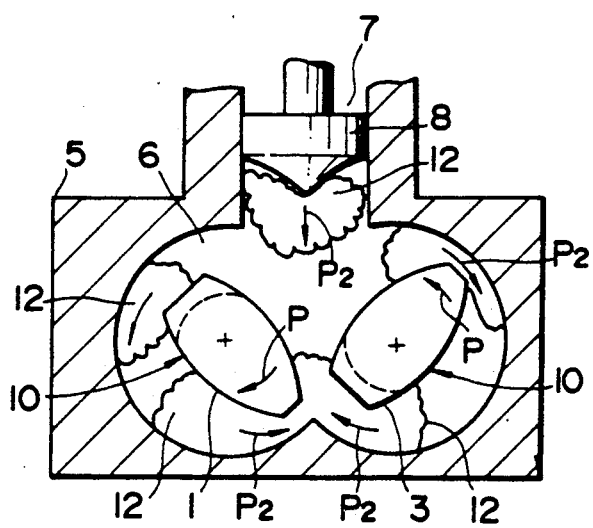
Figure 7:
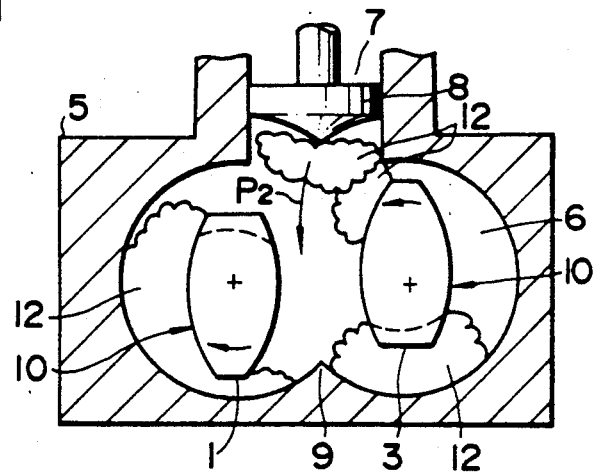

In FIG. 1 wherein the right and left rotors 10, 10 are facing each other, there is a tip clearance $h_0$ between a tip 1a of the main blade 1 and the casing inner surface of the kneading chamber 6, like that in conventional intermeshing type rotors. The auxiliary blade 3 is in phase with the tip 1a of the main blade 1 of the other rotor 10, and between it and the said tip 1a there is an inter-rotor clearance A which is larger than the aforesaid clearance $h_0$. Thus, the rotors are intermeshing in the sense that the loci of points defined by the tips of 1a of the main blades 1 overlap one another, but the clearance $h_0$ exists since the auxiliary blades 3 have a height less than that of the main blades, and each main blade is in phrase with the auxiliary blade of the other rotor. The flow of material 12 introduced is as indicated by arrow $P_2$. In the illustrated condition, the material 12 is separated by the rotors into a portion on the hopper 7 side and a portion on the door 9 side. Then, the rotors 10, 10 rotate in opposite directions as indicated by arrow P until facing vertically as shown in FIG. 4. In this state, the space of a communicating portion formed between the hopper 7 and the door portion 9 is wholly opened, so the material 12 in the hopper 7 drops smoothly as indicated by arrow $P_2$. With further rotation of the rotors 10, 10 into the state illustrated in FIG. 5, the main blade 1 of the left-hand rotor 10 in the figure and the auxiliary blade 3 of the other rotor 10 nip the dropping material, and the material 12 is pulled in toward the door side 9 as indicated by arrow $P_2$ by the rotation of both rotors 10 and the resulting interaction of both blades 1, 3. After the state of FIG. 5 there is again obtained the state of FIG. 1 referred to previously. In this way the material 12 is sure to be fed under pressure toward the door side 9. With further rotation of the rotors 10, 10 from the state of FIG. 1, there reappears the state of FIG. 4 explained previously, in which the space of the communicating portion between both rotors 10, 10 is opened so the feed of the material 12 from the hopper 7 side is again performed smoothly. On the other hand, the material 12 which has been pulled in to the door side 9 in FIG. 5 passes the tips while undergoing shear between the casing inner surface of the kneading chamber 6 and the front surfaces of both rotors 10, 10 and moves to the rotor back surfaces, as shown in FIG. 6. In this case, the amount of the material passing the tip 1a side of the main blade 1 is small and the material 12 located under the rotor front surface is again pushed out to below the forcing ram 8, but since the amount of the material passing the tip 3a of the auxiliary blade 3 is large, the amount of the material accumulated on the rotor front surface becomes small. When rotors further rotate into the state of FIG. 7, there is little possibility of the space under the forcing ram 8 being filled with the material 12 which has previously been fed and pulled in, so the fall of the material 12 is not impeded and the material 12 is continued to be pulled in smoothly. Thus, it is possible to overcome the problems related to the material bite-in performance in the conventional intermeshing type rotors. In the embodiments of the present invention, structural parts other than a pair of right and left intermeshing type kneading rotors 10, 10 may be just the same as in the conventional closed type kneaders of this type, so the details of a cylinder 5, a kneading chamber 5, a hopper 7, a forcing ram 8 and a door portion 9 will not be explained.

Figure 10:
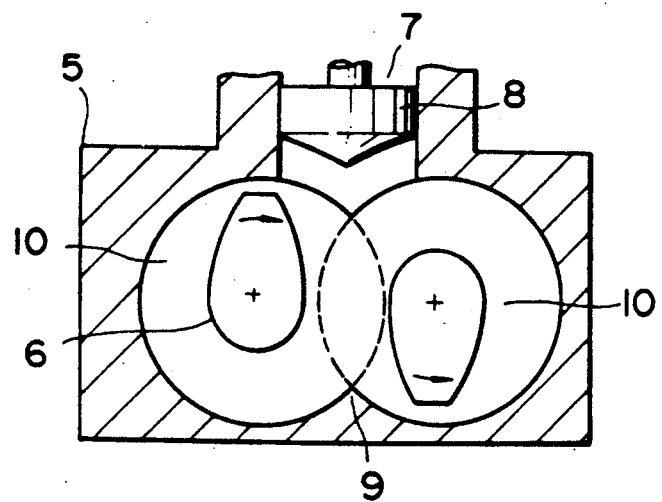
FIG. 10 is an explanatory view of two-blade type rotors.

As previously stated, in FIG. 1 to 3, each rotor 10 is a two-blade type rotor comprising, as illustrated one rotor in FIG. 2, a long, main blade 1 twisted at an angle of torsion α from one end of a rotor having an axial length L toward the other end thereof, and a long, auxiliary blade 3 having an angle of torsion α not smaller than 0° from the one end of the rotor toward the other end side thereof in a 180° symmetric position with respect to the main blade 1, the auxiliary blade 3 being formed in the same direction so that its length is not smaller than ½ of the rotor axial length. The conventional rotors shown in FIGS. 12, 13 and 16, 17 are all four-blade type rotors, while the two-blade type rotor in the present invention is a rotor having one blade (one tip) in rotor section as shown in FIG. 10, with the number of tips being half of that of the conventional four-blade type. As shown in FIG. 1, between the casing inner surface of the kneading chamber 6 and the tip 1a of the main blade 1 there is a tip clearance $h_0$ like that in the conventional intermeshing type rotor blades. Further, in a synchronized stage of both right and left rotors 10, 10 shown in FIG. 1, an inter-rotor clearance A larger than the tip clearance $h_0$ is formed between a tip 3a of the auxiliary blade 3 and a tip 1a of the main blade 1 of the other rotor.

The numerals 2 and 4 denote a short main blade and a short auxiliary blade, respectively, which are formed at angles of torsion contrary to the long, main and auxiliary blades 1, 3 from the side of the rotor 10 opposite to the side where both blades are formed. The short main blade 2 has the same tip clearance $h_0$ as that of the main blade 1, and the short auxiliary blade 4 also has an inter-rotor clearance A like that of the auxiliary blade 3. In the present invention, the rotors 10, 10 having the structure described above are disposed side by side as right and left rotors so that the auxiliary blades 3 of both rotors are in phase with the tips 1a of the main blades 1 of the mating rotors at the rotor central portions, as is apparent from the relative blade positions of both rotors 10, 10 shown in FIG. 3 and from the in phase state of both rotors shown in FIG. 1.

According to the structure of the above embodiment, as seen in the blade correlation of both rotors 10, 10 shown in FIG. 3, in which the numerals 1, 2, 3 and 4 represent long and short, main and auxiliary blades of one rotor, while 1', 2', 3' and 4' represent long and short, main and auxiliary blades of the other rotor, the main and auxiliary blades 1, 3' are at 0° phase at the rotor central part O—O, and also in an axial range (overlap) X in which the auxiliary and main blades 3, 1' of both rotors overlap each other, the phase is near 0°. Further, also at the main and short auxiliary blades 1, 4' of both rotors, the phase is near 0°, and thus there is obtained synchronism of the right and left rotors 10, 10 throughout the whole of the rotors, whereby there is attained the smooth and strong pull-in action for the fed material 12 explained previously in connection with FIGS. 4 to 7, thus improving the bite-in performance.

Figure 11:
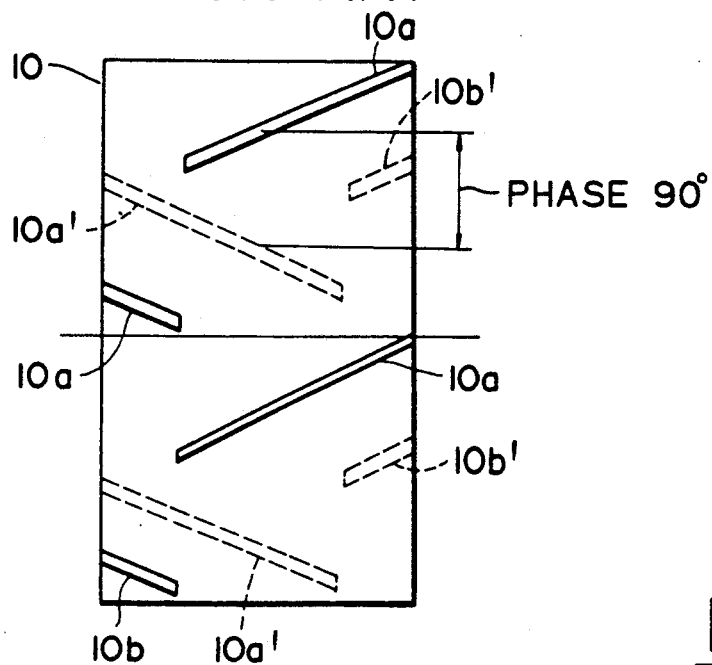
FIG. 11 is a developed plan view showing a blade arrangement relation in a conventional intermeshing type rotor.
Figure 12:
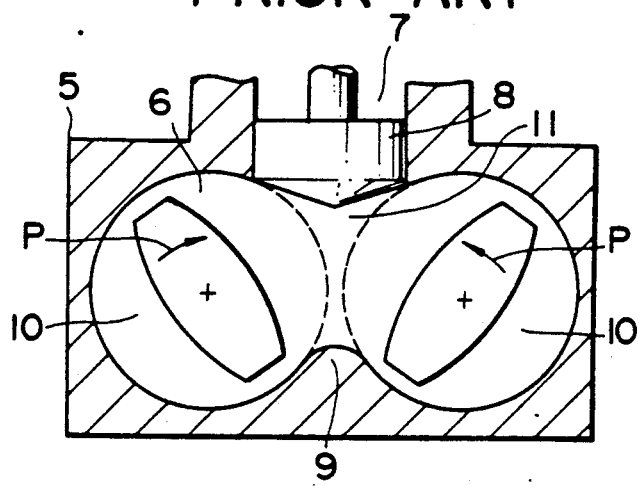
FIG. 12 is a sectional view of a principal portion of a conventional non-intermeshing type closed kneader.
Figure 13:
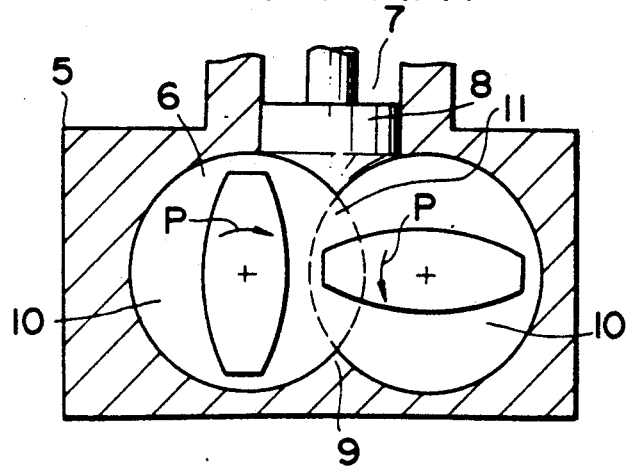
FIG. 13 is a sectional view of a principal portion of a conventional intermeshing type closed kneader.
Figure 14:
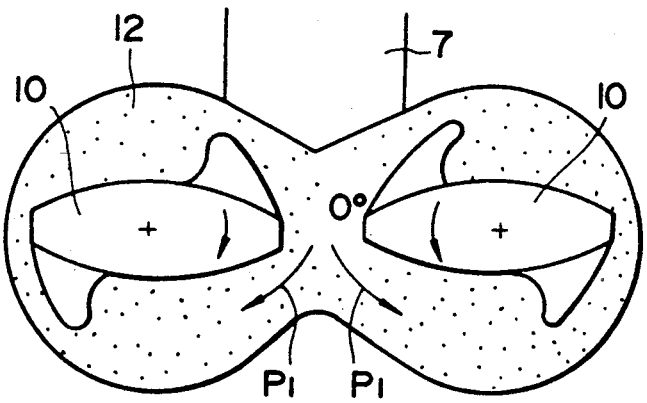
FIGS. 14 and 15 are explanatory views of phases and material motions in the kneader of the type illustrated in FIG. 12.
Figure 15:
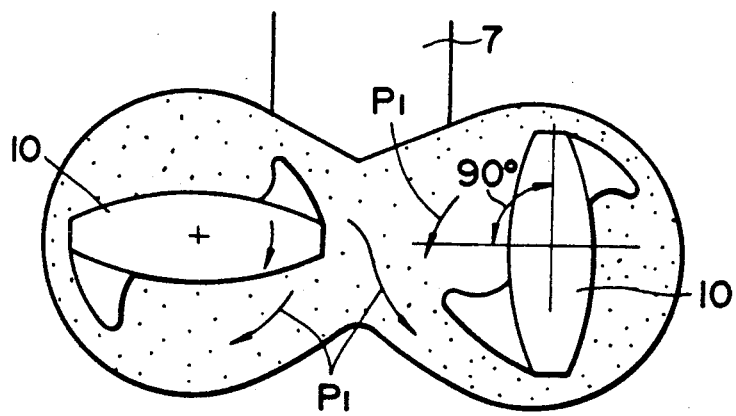
Figure 16:
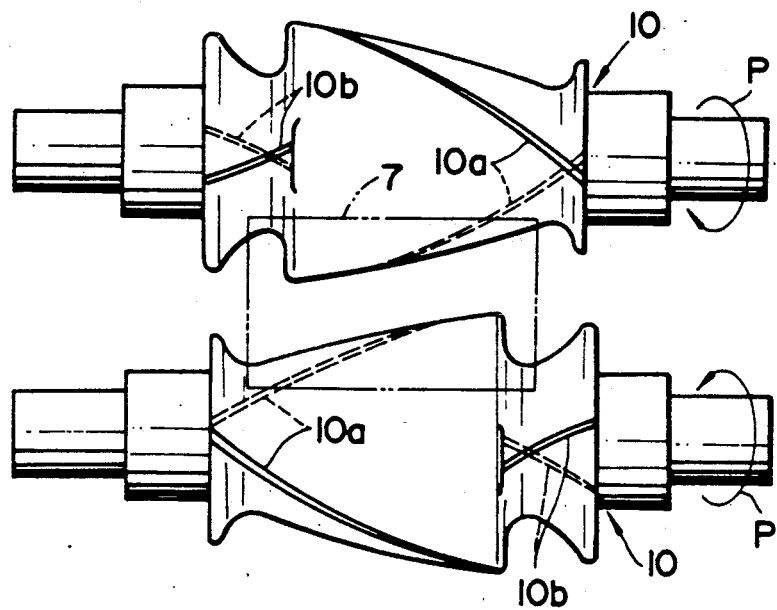
FIG. 16 is a plan view of conventional non-intermeshing type rotors.
Figure 17:
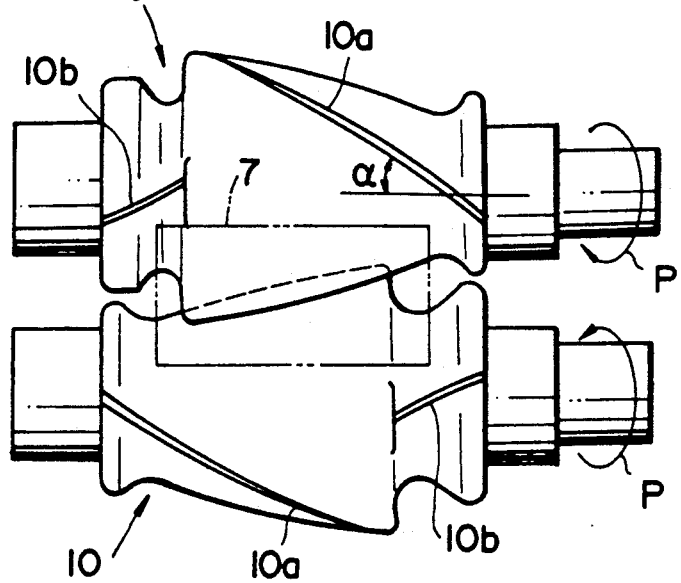
FIG. 17 is a plan view of conventional intermeshing type rotors.
Figure 18:
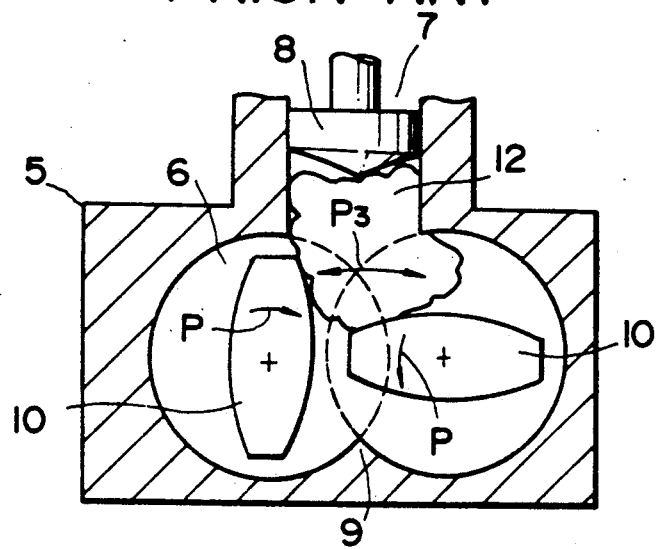
FIG. 18 is a view explanatory of motions of material introduced in the rotors of the type illustrated in FIG. 17.

On the other hand, in the conventional intermeshing type rotors illustrated in FIGS. 13 and 17, 18, the rotor blades are arranged as shown in FIG. 11, the rotor blades 10a, 10a' of both rotors 10, 10 are at a tip phase of 90° as shown at the central part in the rotor axis direction which is important in pulling in the fed material 12. And the tip phases of the two are deviated from each other throughout the entire rotor blade arrangement. This causes the problem previously referred to in connection with FIGS. 17 and 18.

Figure 8:
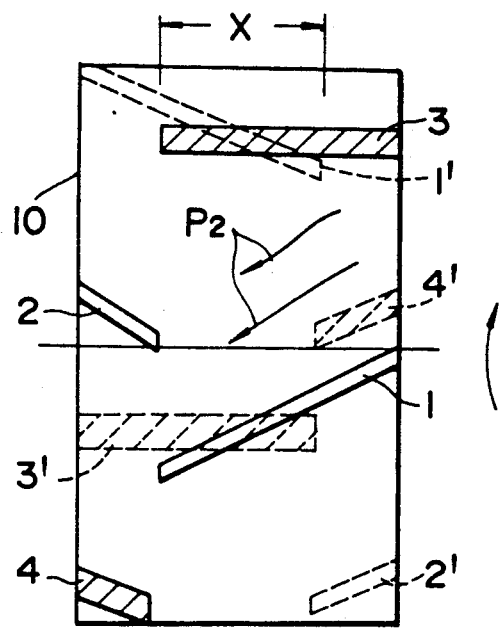
FIGS. 8 and 9 are developed plan views showing examples of rotors according to the present invention.

Although in the above embodiment the long auxiliary blade 3 is at the same angle of torsion α as the main blade 1, it is not always necessary to set the two at the same angle of torsion. As in the embodiment illustrated in FIG. 8, the angle of torsion α of the auxiliary blade 3 may be set at 0°, so that the phase thereof with the main blade 1' of the other rotor is close to 0° in the range of overlap X, thereby the bite-in performance can be further improved. If the angle of torsion α is set to the minus side, the phase of the overlap portion X becomes closer to 0°, but this impedes the axial flow $P_2$ of the material by the main blade 1 shown in FIG. 8, and so is not desirable.

Figure 9:
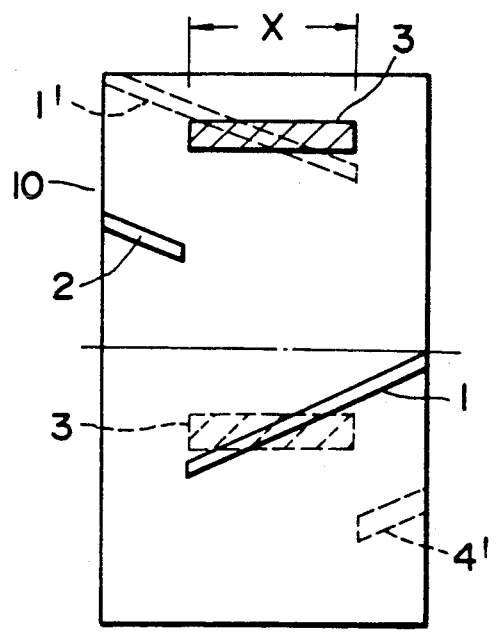

The length of the long auxiliary blade 3 is not always required to be the same as the length of the main blade 1 as in the embodiment previously illustrated in FIG. 2. If only it is in the range of overlap X (usually about ½ of the overall rotor length) as in the embodiment shown in FIG. 9, there will be obtained the same effect.

According to the present invention, the drawback that it is difficult to introduce a large amount of material and the operability and productivity are low because of poor bite-in performance, which drawback is common to closed type kneaders using intermeshing type rotors, can be overcome easily by providing an auxiliary blade so as to synchronize in phase with the main blade tip of a mating rotor over a length not shorter than ½ of the rotor axial length. In this point the present invention is extremely advantageous and superior. By this construction it is possible to introduce a large amount of material, improve the bite-in performance for the material and further improve the operability and productivity. Moreover, by stabilizing the bite-in performance it is possible to avoid increase of the scatter in quality between batches, maintain stable kneading contents and uniform quality and facilitate production control. Besides, since these can be attained merely by modifying the structure of rotor blades, the invention can be practiced extremely easily.

Obviously, numerous modifications and variations of the present invention are possible in light of the above teachings. It is therefore to be understood that within the scope of the appended claims, the invention may be

I claim:

1. A closed type kneader comprising:
   a casing:
   two rotors rotatably mounted in said casing for rotation about parallel axes;
   two blades extending from each of said rotors such that the locus of the tip of at least one of said blades of one of said rotors overlaps the locus of the tip of at least one of the blades of the other rotor, said blades of each of said rotors comprising a main blade extending at an angle of torsion along the rotor and an auxiliary blade, a tip of said auxiliary blade having a radius less than that of said main blade and a length not less than one half of the rotor axial length and having an angle of torsion not smaller than 0° in the same direction as the angle of torsion of the main blades; and
   means for rotating said rotors in synchronism such that the main blade tip of each rotor is in phase with the auxiliary blade tip of the other rotor at the axial centers of the rotors.

2. The kneader of claim 1 wherein there is an interblade clearance between the main blade tip of one rotor and the auxiliary blade tip of the other rotor and said interblade clearance is greater than a clearance between the main blade tip of said one rotor and the casing.

3. The kneader of claim 2 wherein the main blade of one rotor and the auxiliary blade of the other rotor axially overlap one another.

4. The kneader of claim 3 wherein said main and auxiliary blades of each of said rotors are mutually angularly spaced by 180°.

* * * * *